(12) United States Patent
Mozurkewich et al.

(10) Patent No.: US 11,220,220 B2
(45) Date of Patent: Jan. 11, 2022

(54) VEHICLE STORAGE COMPARTMENT

(71) Applicant: Ford Global Technologies, LLC, Dearborn, MI (US)

(72) Inventors: Kevin Mozurkewich, Livonia, MI (US); James Hugh Fowler, Novi, MI (US); Luis Javier Benavides, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 16/151,794

(22) Filed: Oct. 4, 2018

(65) Prior Publication Data

US 2020/0108777 A1    Apr. 9, 2020

(51) Int. Cl.
*B60R 5/02*    (2006.01)

(52) U.S. Cl.
CPC ...................................... *B60R 5/02* (2013.01)

(58) Field of Classification Search
CPC .... B60R 5/02; B60R 5/00; B60R 7/04; B60R 5/04; B60R 5/045; B60R 7/043; B60Q 3/30; B60N 2/36

USPC ............ 296/37.15, 37.16, 24.43, 24.44, 37.5
See application file for complete search history.

(56) References Cited

U.S. PATENT DOCUMENTS

| | | | |
|---|---|---|---|
| 4,884,733 A * | 12/1989 | Geeves | B60R 7/02 |
| 5,224,748 A | 7/1993 | Decker et al. | |
| 8,573,670 B2 | 11/2013 | Zekavica et al. | |
| 10,286,849 B2 * | 5/2019 | Clifford | B60R 7/04 |
| 10,661,842 B2 * | 5/2020 | Povinelli | B60R 5/041 |
| 10,744,949 B2 * | 8/2020 | Andrus | B60R 7/04 |
| 2010/0090491 A1 | 4/2010 | Hipshier et al. | |
| 2018/0134222 A1 | 5/2018 | Schmidt et al. | |
| 2019/0232847 A1 * | 8/2019 | Kim | B60R 7/04 |

* cited by examiner

*Primary Examiner* — Stephen T Gordon
(74) *Attorney, Agent, or Firm* — David Coppiellie; Price Heneveld LLP

(57) ABSTRACT

A vehicle storage compartment is provided herein. The vehicle storage compartment includes a frame including a cross member. A track system having first and second tracks is coupled to first and second sides of the frame, respectively. A rotatable member is coupled to the cross member and configured to move from a closed position to an open position. A cover coupled to the cross member and configured to extend along the first and second tracks from a first position to a second position.

11 Claims, 13 Drawing Sheets

VEHICLE STORAGE COMPARTMENT

FIELD OF THE DISCLOSURE

The present disclosure generally relates to a storage compartment, and more particularly, to a vehicle storage compartment.

BACKGROUND OF THE DISCLOSURE

Interior vehicle storage compartments offer occupants of a vehicle space to store luggage and other personal items. It is therefore desired to implement such structures in automotive vehicles for increased storage capabilities within the vehicle.

SUMMARY OF THE DISCLOSURE

According to a first aspect of the present disclosure, a vehicle storage compartment is disclosed. The vehicle storage compartment includes a frame with a cross member. The vehicle storage compartment also includes a track system with first and second tracks coupled to first and second sides of the frame, respectively. A rotatable member is coupled to the cross member and configured to move between closed and opened positions. Additionally, a cover is coupled to the cross member and configured to extend along the first and second tracks from a first position to a second position.

Embodiments of the first aspect of the disclosure can include any one or a combination of the following features:
- a base is coupled to the frame and configured to attach to a vehicle floor, wherein the base and the frame define a cavity that is accessible from a rearward position;
- a locking member is coupled to the panel and is operable between an engaged position and a disengaged position, wherein the locking member is disengaged when the vehicle is in park;
- the cover is deployable along the track system from the first position to the second position as a result of force acting upon the cover, wherein the first position is a stowed position and the second position is a deployed position;
- a removable floor positioned on the base and having a plurality of raised portions that extend from a surface of the removable floor, such that the removable floor includes a first thickness and a second thickness;
- a retaining member is coupled to a first edge portion of the base, wherein the retaining member extends above a top surface of the removable floor; and
- a wall coupled to a vehicle-forward portion of a base that extends vertically therefrom, wherein a light source is coupled to the wall.

According to a second aspect of the present disclosure, a vehicle is disclosed. The vehicle includes a floor, a base configured to engage with the floor, and a frame coupled to the base. A cross member is coupled to top portions of first and second sides of the frame. Additionally, a rotatable member is coupled to the cross member.

Embodiments of the second aspect of the disclosure can include any one or a combination of the following features:
- the cross member is coupled to a vehicle-rearward portion of the frame and the rotatable member is configured to move from a closed position to an open position;
- a locking member is coupled to the rotatable member and is operable between an engaged position and a disengaged position, wherein the locking member is disengaged when the vehicle is in park;
- the rotatable member includes a substantially transparent portion;
- the rotatable member and the base cooperate to define an aperture accessible to a user in a vehicle-rearward location;
- a light source is coupled to the frame; and
- a removable floor is positioned on the base and includes a plurality of raised portions, such that the removable floor includes a first thickness and a second thickness.

According to a third aspect of the present disclosure, a vehicle is disclosed. The vehicle includes a frame having a cross member coupled to first and second vertical members that extend from a vehicle-rearward portion of a base. A track system includes first and second tracks that are coupled to interior surfaces of first and second sides of the frame, respectively. Additionally, a flexible cover is rotatably coupled to the frame and configured to extend along the track system from a first position to a second position.

Embodiments of the third aspect of the disclosure can include any one or a combination of the following features:
- the first position is a stowed position and the second position is a deployed position, wherein the deployed position covers a cavity defined by the frame and the base;
- the flexible cover is configured to extend from the stowed position to the deployed position due to a change in acceleration of the vehicle;
- a light source is coupled to the frame;
- a sensor is configured to sense a presence of items positioned on the base and communicate a signal to a controller indicating the sensed presence; and
- a retaining member coupled to a first edge portion of the base, wherein the retaining member extends above a top surface of the base.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
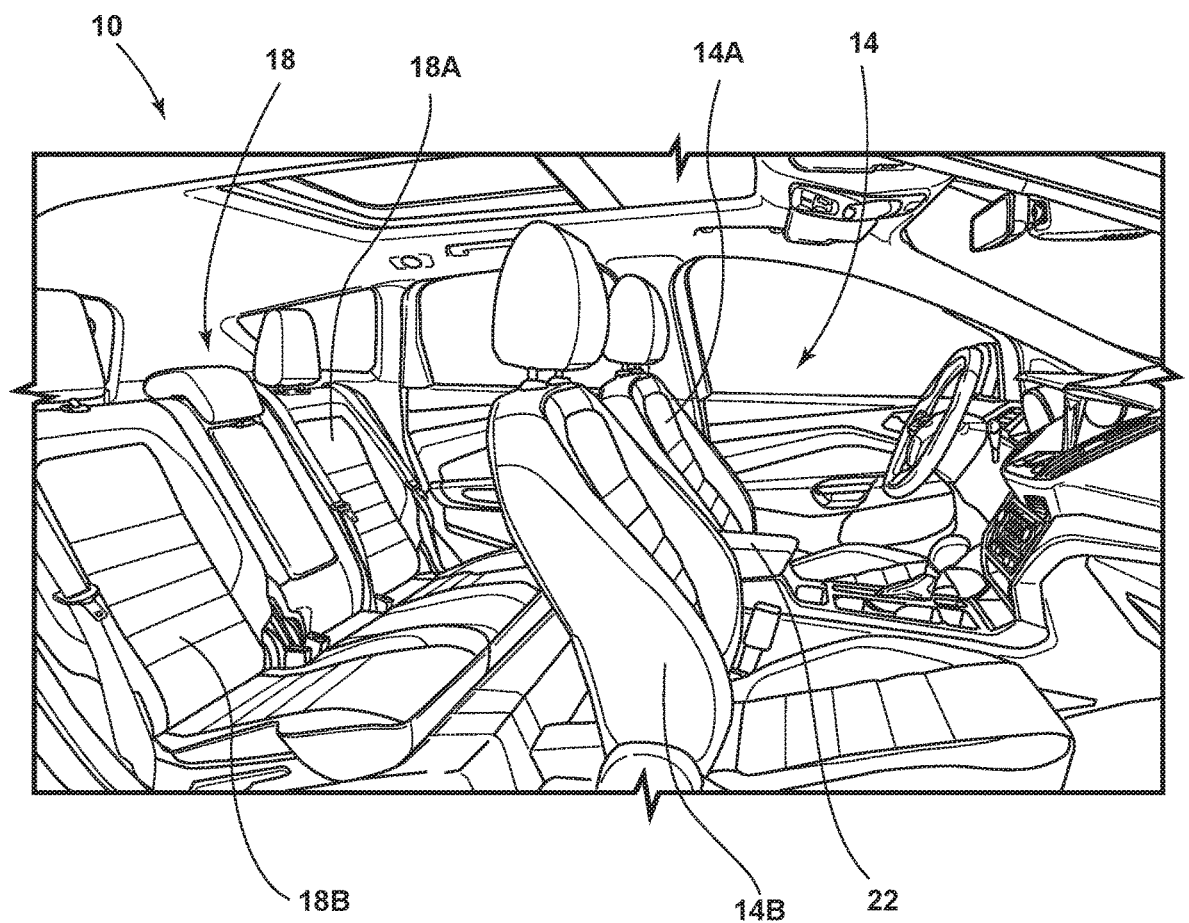
FIG. 1 is a side perspective view of an interior of a vehicle, according to some aspects of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-12, reference numeral 10 generally designates to a vehicle 10. The vehicle 10 may have a first row of seats 14 and a second row of seats 18 rearward of the first row of seats 14. The first and second row of seats 14, 18 may include a first seat 14A, 18A disposed on a driver-side of the vehicle 10 and a second seat 14B, 18B disposed on a passenger-side of the vehicle 10, respectively. The vehicle 10 may have a console 22 positioned between the first and second seats 14A, 14B of the first row of seats 14.

Referring again to FIGS. 1-12, a storage compartment 26 may be positioned within the vehicle 10. The storage compartment 26 may include a frame 30 having first and second sides 30A, 30B connected by a cross member 34. The storage compartment 26 may include a track system 38 having first and second tracks 38A, 38B coupled to the first and second sides 30A, 30B of the frame 30, respectively. A rotatable member 42 may be coupled to the cross member 34 and may be configured to move from a first position 46 to a second position 50. The first position 46 may be a closed position and the second position 50 may be an open position. A cover 54 may be coupled to the cross member 34 and configured to extend along the first and second tracks 38A, 38B from a first position 58 to a second position 62.

Figure 2:
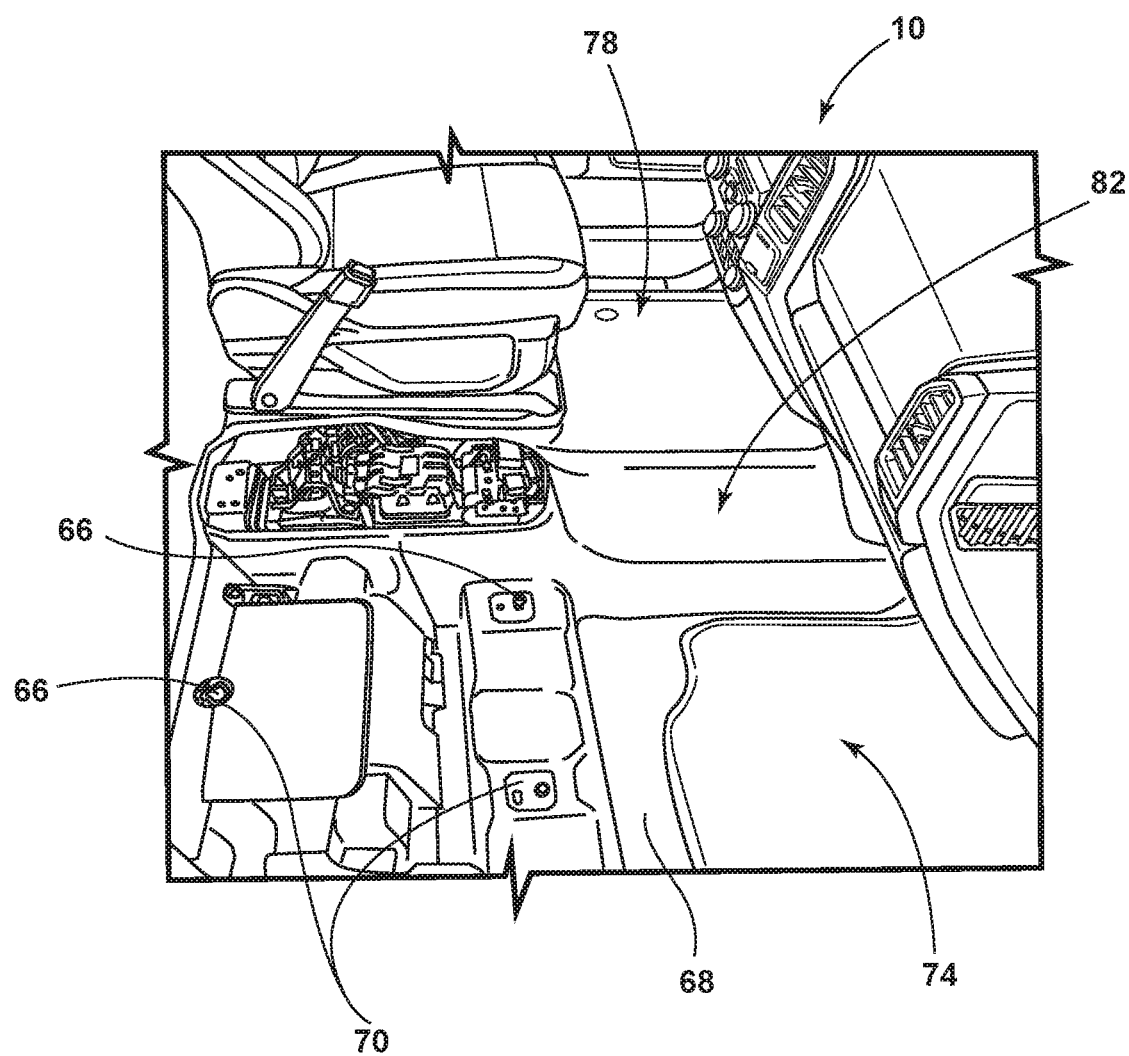
FIG. 2 is a top perspective view of the interior of the vehicle, illustrating a center console and front passenger seat removed from the interior, according to some aspects of the present disclosure.

Referring now to FIG. 2, in various embodiments, the second seat 14B of the first row of seats 14 and the console 22 may be removed from the vehicle 10. The second seat 14B may be coupled to the vehicle 10 with one or more fasteners 66. When the second seat 14B is removed a variety of floor features may be exposed that assist with reinforcing a conventional seating assembly and/or with positioning the seating assembly at a desired height within the vehicle 10. A floor 68 in the front passenger area 74 may define one or more apertures 70 configured to receive the fasteners 66. The fasteners 66 may extend vertically from the floor 68 of the vehicle such that the storage compartment 26 can engage with the fasteners 66. Alternatively, the fasteners 66 may extend from the storage compartment 26 (FIG. 3) and engage with the apertures 70. Further, when the second seat 14B is removed from a front passenger area 74, floor 68 of the vehicle 10 is exposed having a plurality of differing elevations. For example, a vehicle-forward portion of the floor 68 has a lower elevation than a vehicle-rearward portion of the floor 68 in the front passenger area 74. Similarly, a middle portion positioned between the vehicle-forward and vehicle-reward portions of the floor 68 has a lower elevation than the vehicle-rearward portion but a higher elevation that the vehicle-forward portion of the floor 68. The middle portion additionally has lateral plateaus that define a lower valley therebetween. Further, an area between the front passenger area 74 and a front driver-side area 78 has an additional different elevation than the floor 68 in the front passenger area 74. A console area 82 positioned between the front passenger area 74 and the front driver-side area 78 may have further additional elevations. When the console 22 is removed, a vehicle-rearward portion of the console area 82 can have an elevation higher than the elevation of the vehicle-rearward portion of the front passenger area 74. Additionally, a vehicle-forward portion of the console area 82 can have an elevation that is lower than the vehicle-rearward portion of the console area 82 but higher than the elevation of the vehicle-forward portion of the front passenger area 74. In various embodiments, the front passenger area 74 and the console area 82 can include at least five different elevations when the second seat 14B of the first set of seats 14 and the console 22 are removed.

Figure 3:
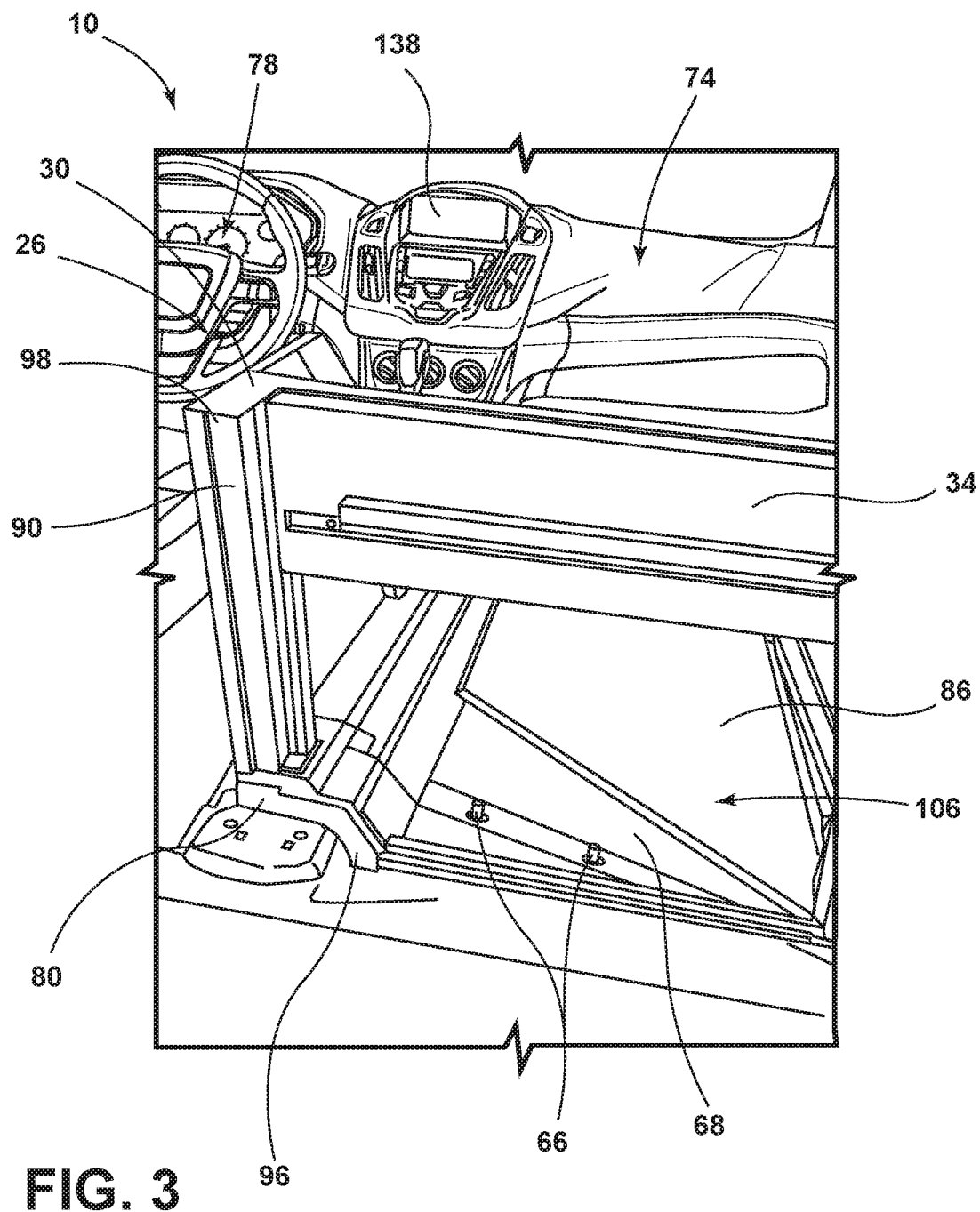
FIG. 3 is a rear perspective view of a storage compartment positioned in a front passenger area of the vehicle, according to some aspects of the present disclosure.

Referring to FIG. 3, the storage compartment 26 may include a base 80 and may be positioned within the front passenger area 74 of the vehicle 10. The storage compartment 26 can provide additional storage space and assist with the placement and/or organization of items within the storage compartment 26. The base 80 of the storage compartment 26 can be contoured to the uneven floor 68 of the front passenger area 74 such that the base 80 is provided with one or more protrusions 84 (FIG. 6) extending from a bottom surface 80A (FIG. 6) of the base 80. It will be understood that the storage compartment 26 can be positioned in an alternative area of the vehicle 10 without departing from the concepts disclosed herein. The storage compartment 26 can be positioned in the second row of seats 18 (FIG. 1). In other embodiments, the base 80 may be positioned in a front driver-side area 78 when the storage compartment 26 is installed, for example, in autonomous vehicles. Alternatively, the storage compartment 26 may be utilized within the vehicle 10 without removing any of the first seats 14A, 18A and/or second seats 14B, 18B. In various embodiments, the base 80 may engage with the floor 68 of the vehicle 10 by the fasteners 66 used to couple the second seat 14B and/or console 22 to the floor 68. It may be advantageous to utilize the same fasteners 66 to couple both the second seat 14B and the base 80 to the floor 68 to allow the second seat 14B and the storage compartment 26 to be more easily interchangeable within the vehicle 10. In other embodiments, the base 80 may be coupled to the floor 68 by other attachments such as, for example, a latch and striker, quarter turn couplers, and/or rails. A removable floor 86 may be positioned on the base 80 such that the removable floor 86 is positioned over the fasteners 66 to prevent visibility of the fasteners 66 by an occupant. Additionally, having the removable floor 86 covering the fasteners 66 can prevent occupants from adjusting the positioning of the storage compartment 26 when the removable floor 86 is positioned on the base 80.

Referring again to FIG. 3, the frame 30 may include first and second vertical members 90, 94 (FIG. 5) coupled to the vehicle-rearward edge portion 96 of the base 80. In some embodiments, the first and second vertical members 90, 94 may be separate elements coupled to the base 80. Alternatively, the first and second vertical members 90, 94 may be integrally formed with the base 80 and extend vertically therefrom. The cross member 34 can be connected to the first and second vertical members 90, 94. In some embodiments, the cross member 34 may be coupled to top portions 98, 102 (FIG. 5) of the first and second vertical members 90, 94, respectively. In other embodiments, the cross member 34 and the first and second vertical members 90, 94 may form a single element. The first and second vertical members 90, 94 and the cross member 34 may define the aperture 106 accessible from a rearward position such as a vehicle-rearward location. Regardless of the positioning of the cross member 34, the cross member 34 can assist in retaining luggage or other items within the vehicle storage compartment 26. In some embodiments, the cross member 34, the first vertical member 90, and/or the second vertical member 94 may be positioned such that the storage compartment 26 is configured, for example, to retain luggage having dimensions of about 22 inches by 14 inches by 9 inches (e.g., conventional carry-on-sized luggage). Alternatively, the cross member 34 can be positioned on the first and second vertical members 90, 94 at a height sufficient to retain, for example, groceries and other smaller personal items. The cross member 34 can be configured to be adjusted to couple to a variety of locations along the first and second vertical member 90, 94. In alternate embodiments, the storage compartment 26 may be formed from a variety of materials such as, for example, metal, metal alloy, plastic, rubber, acrylic, plexiglass, polypropylene, or polycarbonate. Alternatively, the storage compartment 26 can be formed from a lightweight, strong, and rigid material such as, for example, carbon fiber, aluminum, and/or steel. Additionally, different components of the storage compartment 26 may be formed from different materials (e.g. the cross member 34 formed from rubber and the base 80 formed from plastic). The storage compartment 26 can be made by injection molding. Alternatively, the storage compartment 26 can be formed by tubular components molded and/or welded together.

Figure 4:
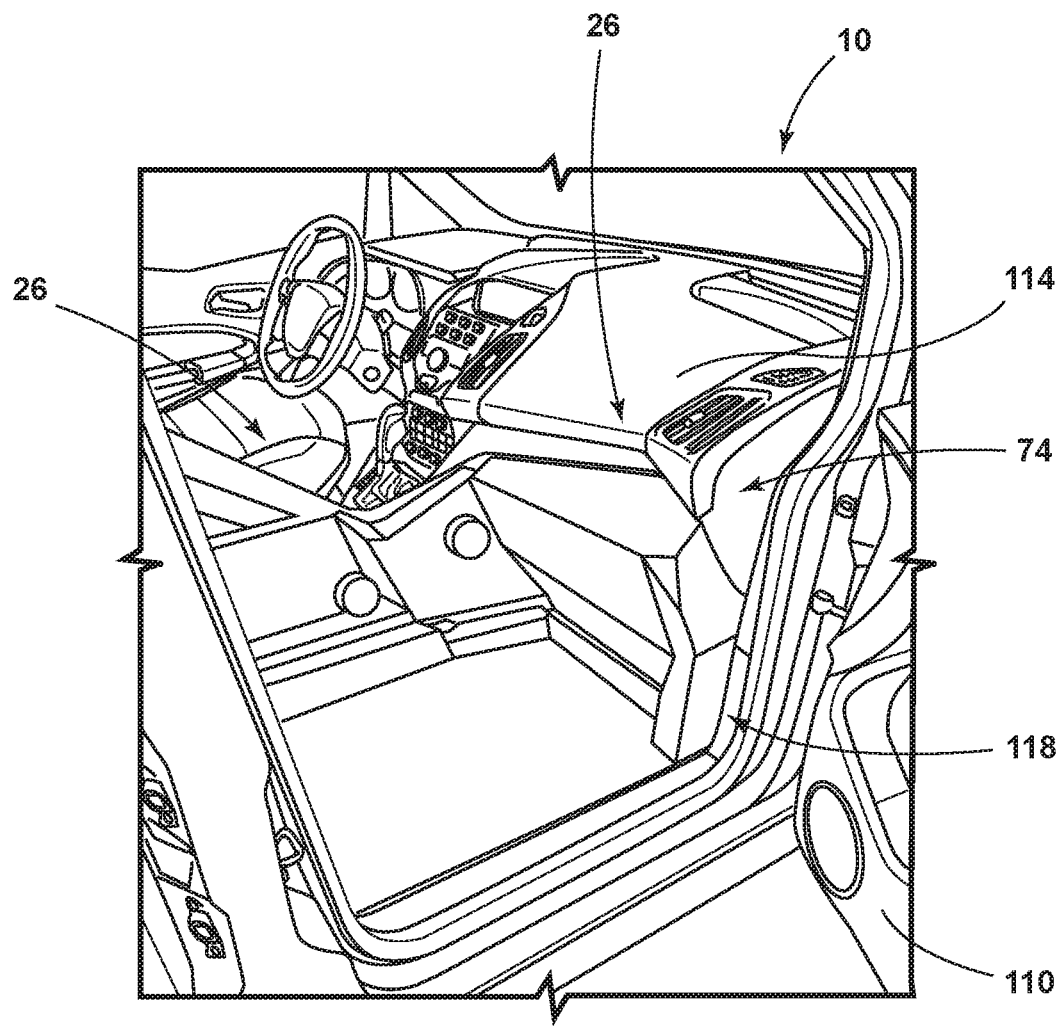
FIG. 4 is a side perspective view of the storage compartment positioned in the front passenger area of the vehicle, according to some aspects of the present disclosure.

Referring to FIG. 4, the storage compartment 26 may be accessible from a location external the vehicle 10 and/or from vehicle-rearward location such as, for example, the second row of seats 18 (FIG. 1). The external location may be proximate the passenger-side of the vehicle 10 when a passenger-side door 110 is open. The storage compartment 26 may extend under a portion of a dashboard 114 in the front passenger area 74 of the vehicle 10. A vehicle-forward portion 118 of the storage compartment 26 may be configured to allow the storage compartment 26 to be positioned proximate the dashboard 114. The vehicle-forward portion 118 of the storage compartment 26 may be configured to not include a substantially horizontal and flat top surface to prevent occupants from stacking luggage and/or other items in a manner that would hinder occupant visibility and/or interfere with safety features (e.g., airbag deployment). In alternate embodiments, the vehicle-forward portion 118 of the storage compartment 26 may be configured to prevent interference with access to a compartment within the dashboard 114 (e.g., glove compartment). Additionally, the storage compartment 26 can have a length in the fore-aft direction that can allow a rearward passenger to sit immediate behind the storage compartment 26. Alternatively, the storage compartment 26 can have a length in the fore-aft direction such that a passenger cannot sit immediately behind the storage compartment 26.

Figure 5:
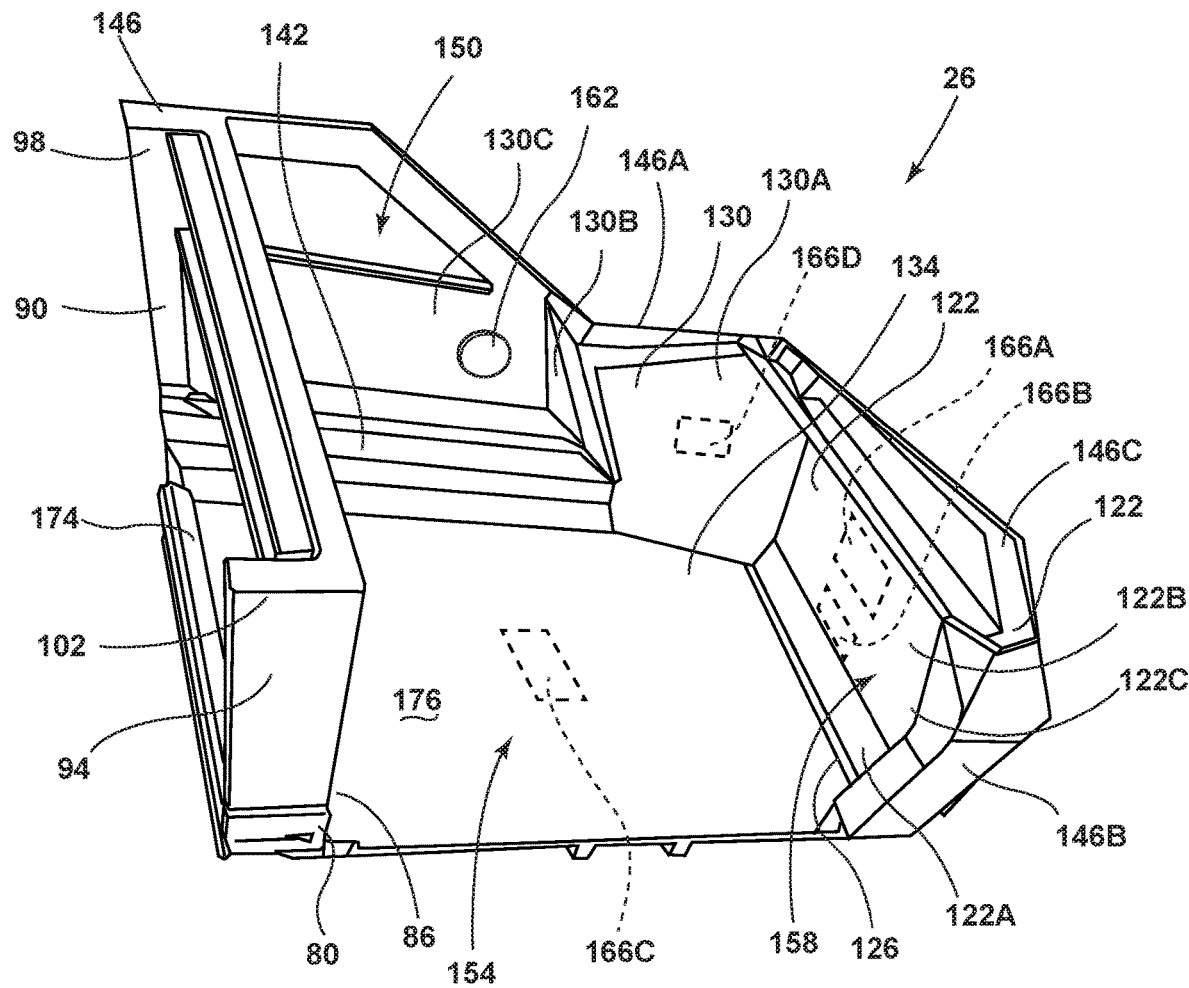
FIG. 5 is a side perspective view of the storage compartment, according to some aspects of the present disclosure.

Referring to FIG. 5, a first wall 122 may be coupled to a vehicle-forward edge portion 126 of the base 80 and extend vertically therefrom. In various embodiments, the first wall 122 may be integrally formed with the base 80. The first wall 122 may include a bottom portion 122A that extends at an angle from the base 80 and a top portion 122B that extends substantially vertically from the bottom portion 122A. The angle can be an obtuse angle such as, for example, in the range of about 90° to about 180° and/or any intermediate value therebetween. It may be advantageous to include the bottom portion 122A of the first wall 122 extending at an obtuse angle from the base 80 to assist in positioning the storage compartment 26 proximate and/or under a portion of the dashboard 114 (FIG. 3) while preventing cargo items from becoming lodged or lost during vehicle maneuvers. The storage compartment 26 may include a second wall 130 coupled to a lateral edge portion 134 of the base 80 and extending vertically therefrom. The first wall 122 and the second wall 130 may be coupled to adjoining edge portions of the base 80. In various embodiments, the lateral edge portion 134 may be proximate the first seat 14A of the first row of seats 14 (FIG. 4). The second wall 130 may include a vehicle-forward portion 130A, a middle portion 130B, and a vehicle-rearward portion 130C. The vehicle-forward portion 130A may be coupled to the first wall 122 and extend in a vehicle-rearward direction therefrom. The middle portion 130B may be coupled to the vehicle-forward portion 130A and extend in a vehicle-rearward direction therefrom. The middle portion 130B may be coupled to the vehicle-forward portion 130A and extend at an angle from the vehicle-forward portion 130A towards the driver-side area 78 (FIG. 2). The angle can be an obtuse angle, for example, an angle in the range of about 180° to about 360° and/or any intermediate value therebetween. The middle portion 130B may be coupled to the vehicle-rearward portion 130C of the second wall 130. The vehicle-rearward portion 130C extends in a vehicle-rearward direction from the middle portion 130B and is positioned a greater lateral distance from the base 80 when compared to the vehicle-forward portion 130A. It may be advantageous to have the vehicle-forward and vehicle-rearward portions 130A, 130C of the second wall 130 be at different distances from the base 80 to assist in coupling the base 80 to the floor 68 (FIG. 2) of the vehicle 10 without interfering with a user interface 138 (FIG. 3) proximate the dashboard 114 (FIG. 3).

Referring again to FIG. 5, a platform 142 may be positioned between the vehicle-rearward portion 130C of the second wall 130 and the base 80. In various embodiments, the storage compartment 26 may have a width in the latitudinal direction such that the base 80 may be coupled to the front passenger area 74 and the platform 142 may be coupled to the console area 82 (FIG. 2) of the vehicle 10. In some examples, the storage compartment 26 may include a border member 146. The border member 146 can include first and second lateral portions 146A, 146B and a vehicle-forward portion 146C. The first lateral portion 146A may be positioned on the storage compartment 26 proximate the first seat 14A. The first lateral portion 146A may be coupled to the top portion 98 of the first vertical member 90 and extend horizontally therefrom in a vehicle-forward direction. In some embodiments, the first lateral portion 146A of the border member 146 may extend from the first vertical member 90 in a substantially horizontal direction and then decline at an angle to be coupled to the middle portion 130B of the second wall 130. The first lateral portion 146A may extend over, and cooperate with, the vehicle-rearward portion 130C of the second wall 130 to define an aperture 150 that is accessible from the first seat 14A (FIG. 4). Additionally, the first lateral portion 146A may also extend over the middle and vehicle-forward portions 130B, 130A of the second wall 130. Further, the first lateral portion 146A may extend toward the base 80 between the middle and vehicle-forward portions 130B, 130A of the second wall 130 and terminate proximate the platform 142.

Referring further to FIG. 5, the second lateral portion 146B may be coupled to the first wall 122 and the base 80 proximate the passenger-side door 110 (FIG. 4). In various embodiments, the second lateral portion 146B may be coupled to a lateral edge portion 122C of the first wall 122 and extend horizontally therefrom in a vehicle-rearward direction. In some embodiments, the second lateral portion 146B may extend horizontally from the first wall 122 and then at an angle into an interior 154 of the storage compartment 26. In various embodiments, the border member 146 may include a vehicle-forward portion 146C coupled to the top portion 122B of the first wall 122. The vehicle-forward portion 146C may be advantageous in positioning the storage compartment 26 proximate and/or under a portion of the dashboard 114 (FIG. 4) to provide more storage space while preventing cargo items from becoming lodged or lost during vehicle maneuvers. The vehicle-forward portion 146C may extend in a vehicle-rearward direction such that the vehicle-forward portion 146C may cooperate with the second lateral portion 146B of the border member 146 and the vehicle-forward portion 130A of the second wall 130 to define a cavity 158. It may be advantageous for the storage compartment 26 to have an open top portion (e.g. no top surface) such that visibility of the interior 154 of the storage compartment 26 can be substantially unobstructed from occupants within the vehicle 10. Additionally, the passenger-side door 110 can act as a wall for the storage compartment 26 when the passenger-side door 110 is in a closed position. It may be advantageous for the passenger-side door 110 to act as a wall of the storage compartment 26 such that an additional wall member does not need to be attached, thereby reducing production time and costs.

Referring still further to FIG. 5, a light source 162 may be coupled to at least one of the first and second walls 122, 130. In other embodiments, the light source 162 may be coupled to the frame 30. In some embodiments, the light source 162 may be configured to illuminate in low-light conditions. In other embodiments, the light source 162 may be configured to illuminate in response to, for example, an opening an exterior door of the vehicle. Alternatively, the light source 162 may be operably coupled to a controller 170 (FIG. 12) such that the light source 162 can indicate to an occupant (e.g., flash) if items remained within the storage compartment 26. The light source 162 may include one or more light sources and may include one or more types of light sources. For example, the light source 162 may be, but is not limited to, fluorescent lighting, light emitting diodes (LEDs), organic LEDs (OLEDs), polymer LEDs (PLEDs), and/or solid-state lighting. According to some embodiments, one or more light sources 162 may be configured to emit a wavelength of light that can be characterized as visible light (about 380-700 nanometers) and/or white light (about 390-700 nanometers) to take advantage of the relative low cost attributable to those types of LEDs.

Referring yet again to FIG. 5, a sensor 166 may be coupled to one of the first and second walls 122, 130, the base 80, and/or the removable floor 86. The sensor 166 can be configured to sense the presence of items positioned on the base 80 and communicate a signal to a controller 170 (FIG. 12) such that the controller 170 may indicate the presence of the item to occupants of the vehicle 10. The sensor 166 may include, for example, an optical sensor 166A, an infrared sensor 166B, a force sensor 166C, and/or a video image sensor 166D. In some embodiments, the force sensor 166C may be coupled to the removable floor 86 and configured to sense when an object is positioned on the removable floor 86. Alternatively, the force sensor 166C may be coupled to the base 80 and positioned beneath the removable floor 86 to sense a force imparted on the removable floor 86 by the object or objects stored on the removable floor 86. The force sensor 166C may be configured to send a signal to the controller 170 (FIG. 12) when a weight exceeds a predetermined threshold such that the force sensor 166C can differentiate between items positioned on the removable floor 86 and the weight of the removable floor 86. Additionally, the optical sensor 166A and/or the infrared sensor 166B may be configured to send signals to the controller 170 (FIG. 12) when an item is positioned in a predetermined location area such that the optical sensor 166A and/or the infrared sensor 166B can differentiate between items within the storage compartment 26 and the storage compartment 26 itself. The optical sensor 166A can be positioned within the storage compartment 26 and/or other locations within the vehicle 10 and may be configured to take images of the interior 154 of the storage compartment 26 upon departure and/or arrival at a location. The optical sensor 166A may cooperate with the controller 170 (FIG. 12) to compare images from an initial departure of the vehicle 10 and an arrival to sense if an item remained within the storage compartment 26. The storage compartment 26 can be a variety of colors; for example, the removable floor 86 may be a dark color (e.g., black) and the first and second walls 122, 130 may be a lighter color compared to the removable floor 86 (e.g., grey and/or white) to provide contrast more readily detectable by the optical sensor 166A and/or infrared sensor 166B. The video image sensor 166D may be positioned within the storage compartment 26 and/or in an alternate location within the vehicle 10. Additionally, the video image sensor 166D may be operably coupled to a video monitoring system to provide for video surveillance of the storage compartment 26.

Referring further still to FIG. 5, retaining member 174 may be coupled to the vehicle-rearward edge portion 96 of the base 80. In various embodiments, the retaining member 174 may extend above a top surface 178 of the removable floor 86. In other embodiments, the retaining member 174 may be coupled to the base 80 and extend vertically above a top surface 176 of the base 80. The retaining member 174 may be configured to assist in preventing small items and/or liquids within the interior 154 of the storage compartment 26 from moving in a vehicle-rearward direction outside of the storage compartment 26. In some embodiments, the retaining member 174 may be integrally formed with the base 80 such that the vehicle-rearward edge portion 96 of the base 80 extends vertically at an angle to a height above the top surface 178 of the removable floor 86. For example, the vehicle-rearward edge portion 96 of the base 80 can extend vertically at an obtuse angle relative to the base 80 such as, for example, in the range of about 90° to about 180° and/or any intermediate value therebetween.

Figure 6:
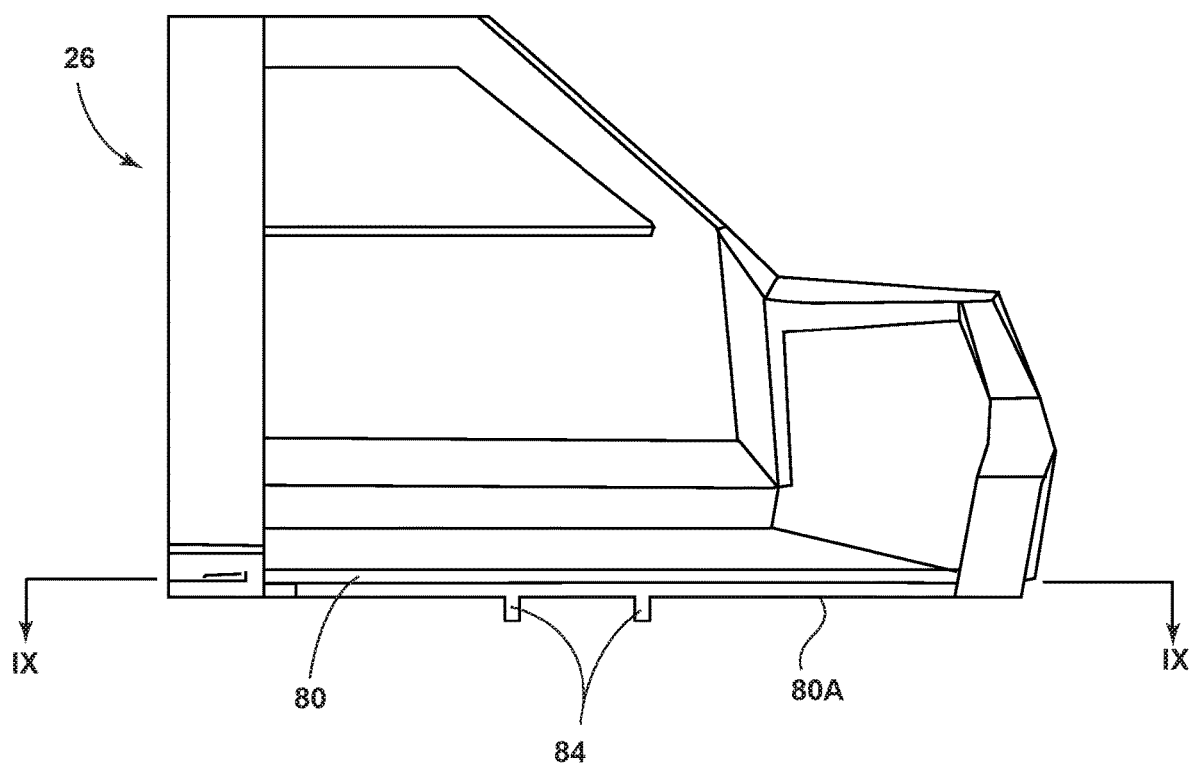
FIG. 6 is a side view of the vehicle storage compartment, according to some aspects of the present disclosure.

Referring now to FIG. 6, the base 80 may include the one or more protrusions 84 extending vertically downward therefrom. In various embodiments, when the second seat 14B is removed from the vehicle 10, the floor 68 is uneven (FIG. 2). The protrusions 84 may be configured to allow the base 80 to be level when positioned within the vehicle 10. The protrusions 84 can engage with the floor 68 (FIG. 2) of the vehicle 10. The protrusions 84 can be positioned proximate the middle portion of the front passenger area 74 where the floor 68 is uneven. Alternatively, the protrusions 84 may be positioned on the base 80 such that the protrusions 84 extend to the vehicle-forward portion of the floor 68, allowing the base 80 to be positioned on the protrusions 84 and the vehicle-rearward portion of the floor 68. Additionally, the protrusions 84 can extend a length substantially similar to a height of the plateaus in the middle portion of the floor 68 of the front passenger area 74, allowing the protrusions 84 to position on the floor 68 and provide the removable floor 86 to be substantially level. The top surface 178 of the removable floor 86 may be substantially linear. The removable floor 86 may be configured to be coupled to the base 80 after the base 80 has been coupled to the floor 68 of the vehicle 10 (FIG. 4). In various embodiments, the floor 68 may be formed from a durable material that is water-resistant and washable. It may be advantageous for the storage compartment 26 to have a water-resistant and washable removable floor 86 to make cleaning the removable floor 86 easier. In some embodiments, the removable floor 86 may be self-draining of liquids thereon.

Referring again to FIG. 6, the storage compartment 26 may include the frame 30 with the first and second sides 30A, 30B connected by the cross member 34. The cross member 34 may be coupled to the top portions 98, 102 of the first and second vertical members 90, 94 of the frame 30. The cross member 34 can be positioned on a vehicle-rearward portion of the frame 30, a vehicle-forward portion of the frame 30, or a middle portion therebetween. In various embodiments, the first side 30A may be proximate the front driver-side area 78. The first side 30A may define an aperture 186 accessible from the front driver-side area 78. The second side 30B may be proximate the passenger-side door 110 (FIG. 4) and define an aperture 190 accessible from a location that is external to the vehicle 10. The interior 154 of the storage compartment 26 may be accessible from apertures 186, 190 simultaneously. The first side 30A may include the first vertical member 90 extending from the vehicle-rearward edge portion 96 of the base 80. The first side 30A may extend horizontally from the first vertical member 90 in a vehicle-forward direction and then extend at a downward angle to terminate proximate the platform 142. The second side 30B of the frame 30 may include the second vertical member 94 extending from the vehicle-rearward edge portion 96 of the base 80. The second side 30B may extend horizontally from the second vertical member 94 in a vehicle-forward direction and then extend at a downward angle to terminate proximate the vehicle-forward edge portion 126 of the base 80. The portions of the first and second sides 30A, 30B that extend downwards towards the vehicle-forward edge portion 126 of the base 80 may be substantially linear. Alternatively the first and second sides 30A, 30B may be curved to correspond to a shape of the dashboard 114 (FIG. 3). The base 80 may be configured to engage with the floor 68 (FIG. 2) of the vehicle 10 and may be coupled to the floor 68 by the fasteners 66 (FIG. 2). The frame 30 may be coupled to the base 80 such that the frame 30 and the base 80 define the interior 154 that may be accessible from a vehicle-rearward location.

Figure 7:
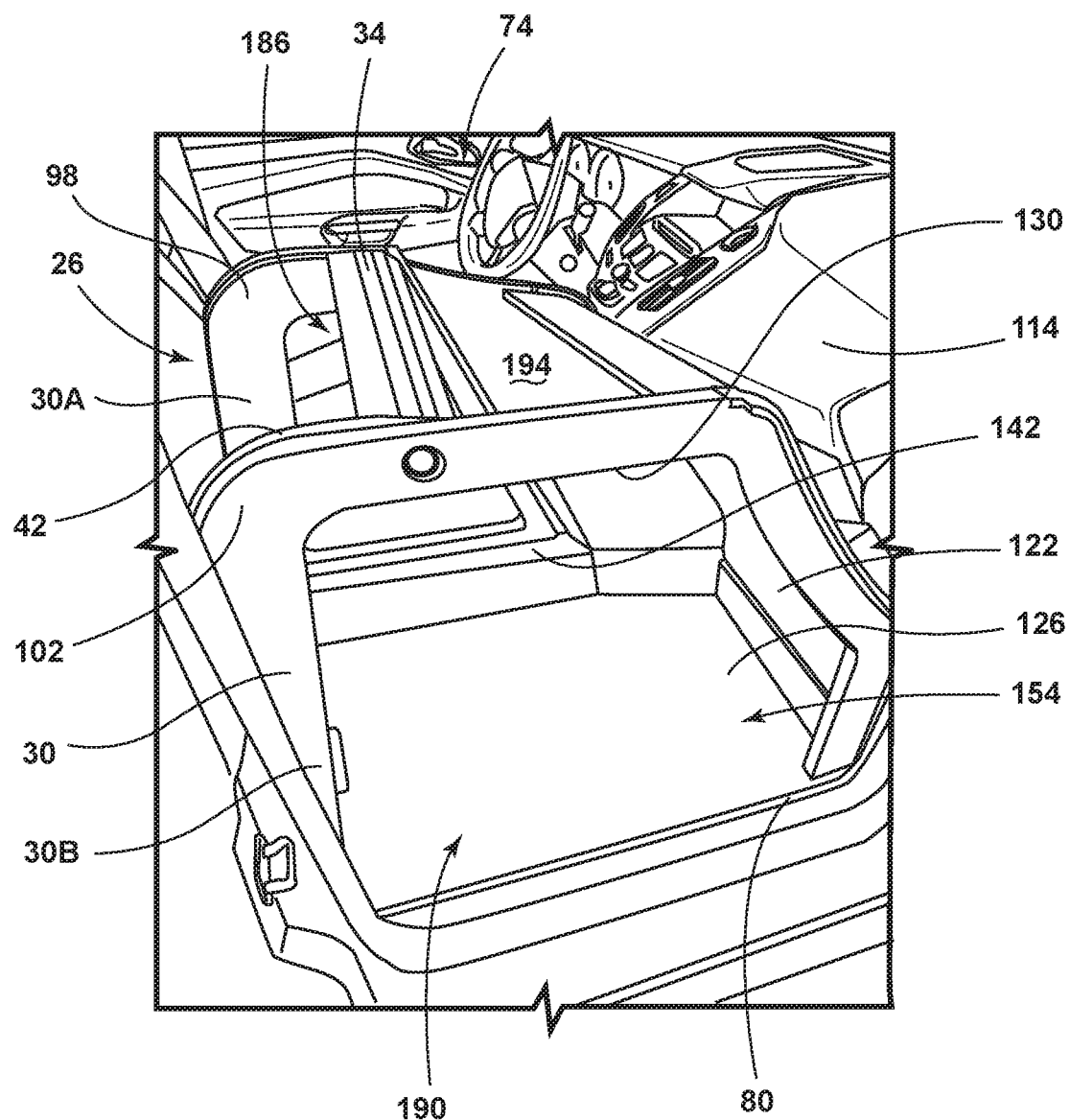
FIG. 7 is a side perspective view of the storage compartment positioned in the front passenger area of the vehicle, according to some aspects of the present disclosure.

Referring to FIG. 7, a top surface 194 may be coupled to the first wall 122 and extend in a vehicle-rearward direction therefrom. The top surface 194 may also extend between the first and second sides 30A, 30B of the frame 30. In various embodiments, the top surface 194 may be coupled to the second wall 130. In other embodiments, the top surface 194 may be coupled to the cross member 34. The top surface 194 and the cross member 34 may define an aperture to allow access into the interior 154 of the storage compartment 26 through a top location. Alternatively, the top surface 194 may be integrally formed with the rotatable member 42 such that the rotatable member 42 and top surface 194 may be configured to allow access to the interior 154 of the storage compartment through a side and top location when the rotatable member 42 is in an opened position. Additionally, the first wall 122 may extend inward towards the interior 154 of the storage compartment 26 to accommodate for the dashboard 114 and/or storage compartments within the dashboard 114 (e.g., glove compartment).

Figure 8A:
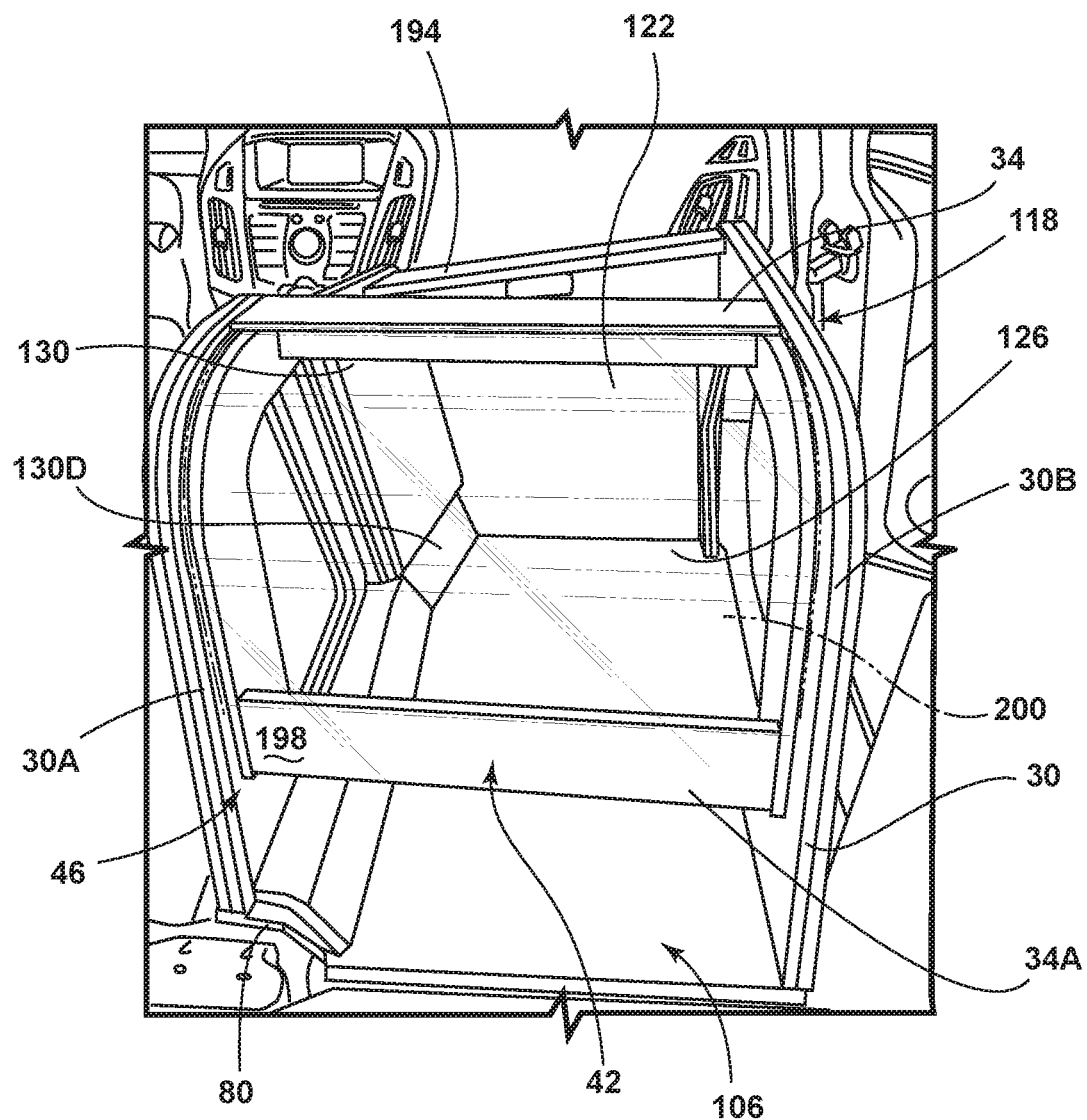
FIG. 8A is a rear perspective view of the storage compartment, illustrating a rotatable member in a closed position, according to some aspects of the present disclosure.

Referring now to FIG. 8A, the first wall 122 may be coupled to the base 80 such that the first wall 122 extends vertically therefrom. In various embodiments, the first wall 122 may be coupled to the vehicle-forward edge portion 126 of the base 80 such that the vehicle-forward portion 118 of the storage compartment 26 is substantially continuous. Additionally, the second wall 130 may be positioned between the first wall 122 and the first side 30A of the frame 30. The second wall 130 may have a bottom portion 130D that extends at an angle from the base 80. The angle can be an obtuse angle relative to the base 80 such as, for example, in the range of about 90° to about 180° and/or any intermediate value therebetween. The sides 30A, 30B may have different heights such that the top surface 194 of the storage compartment 26 may be sloped to one side. Having the top surface 194 at a sloped angle may be advantageous for using a compartment within the dashboard 114 (FIG. 3) or the user interface 138 (FIG. 3) while the storage compartment 26 is positioned within the vehicle 10. The angle can be an acute angle relative to a horizontal axis of the top surface 194 such as, for example, about 0° to about 90° and/or any intermediate value therebetween. The rotatable member 42 is shown in the first position 46, where the first position 46 is a closed position. In various embodiments, the rotatable member 42 may be substantially planar. Alternatively, the rotatable member 42 can be a clamshell lid. In other embodiments, the rotatable member 42 extend in an arc from the cross member 34 towards a vehicle-rearward direction and then in a downward direction. Additionally, the rotatable member 42 can have a variety of arc lengths such that the shape of the rotatable member 42 corresponds with the shape of the frame 30 when the rotatable member 42 is in the closed position. The rotatable member 42 may extend a portion of a height of the frame 30 such that the rotatable member 42 and the base 80 define the aperture 106 which may be accessible from a vehicle-rearward location. A bottom edge portion of the rotatable member 42 may be configured as a cross member 34A to prevent items within the storage compartment 26 from shifting in a vehicle-rearward direction during vehicle maneuvers. It may be advantageous to include aperture 106 to assist in allowing an occupant to access contents within the interior 154 of the storage compartment 26 without removing the contents. In other embodiments, the rotatable member 42 may extend the entire height of the frame 30 such that there is no defined aperture 106. In various embodiments, the rotatable member 42 has a surface 198 that extends from a top edge portion to the bottom edge portion of the rotatable member 42. It may be advantageous for the rotatable member 42 to include the surface 198 extending a substantial length of the rotatable member 42 to prevent items positioned within the storage compartment 26 from shifting to a location exterior of the storage compartment 26 during vehicle maneuvers. The surface 198 may include a substantially transparent portion 200 such that an occupant may view the space within the storage compartment 26. In some embodiments, the aperture 106 may be defined by the surface 198 of the rotatable member 42. The aperture 106 can be covered by a variety of materials to prevent items from shifting to an external location of the storage compartment 26 such as, for example, fish netting, cargo netting, and/or vinyl.

Figure 8B:
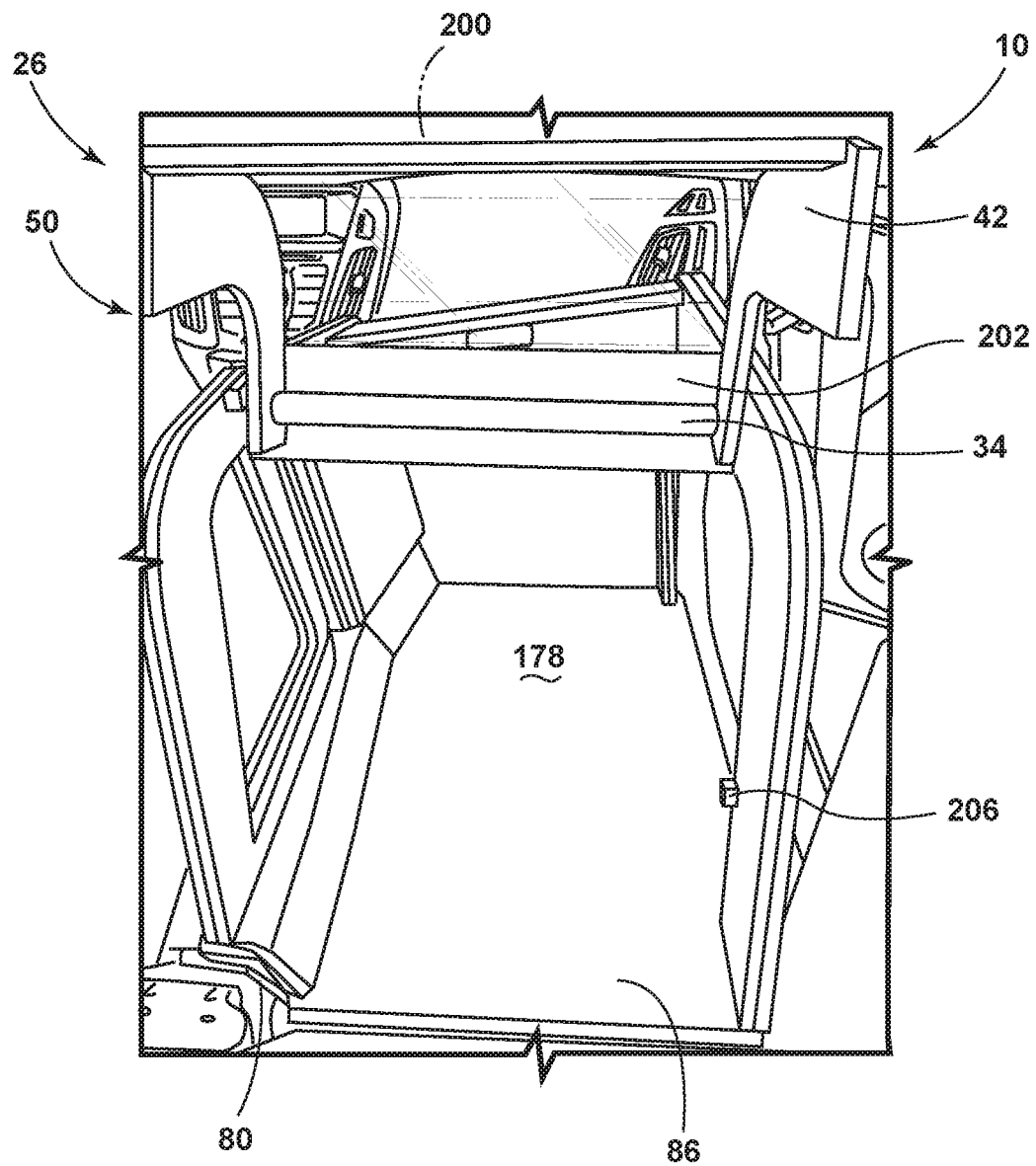
FIG. 8B is a rear perspective view of the vehicle storage compartment, illustrating the rotatable member in an opened position, according to some aspects of the present disclosure.

Referring to FIG. 8B, the rotatable member 42 is shown in the second position 50, where the second position 50 is an open position. A top portion 202 of the rotatable member 42 may be coupled to the cross member 34 and configured to rotate about a horizontal axis defined by the cross member 34 to move the rotatable member 42 between the closed and opened positions. In some embodiments, the cross member 34 may be coupled to a vehicle-rearward portion of the frame 30 such that the rotatable member 42 may be configured to be a vehicle-rearward wall of the storage compartment 26 that is rotatable. Alternatively, the rotatable member 42 may be coupled to the first vertical member 90 and configured to rotate about a vertical axis defined by the first vertical member 90. In various embodiments, the storage compartment 26 may include a locking member 206 coupled to the frame 30. Alternatively, the locking member 206 may be coupled to the rotatable member 42. The locking member 206 may be operable between an engaged and a disengaged state. The locking member 206 can be disengaged when the vehicle 10 is in park, when an occupant is within the vehicle 10, and/or when a vehicle door is open. It may be advantageous to have the locking member 206 engaged when the vehicle 10 is not in park to prevent movement of items stored within the storage compartment 26 while the vehicle 10 is in motion. The locking member 206 may be operably coupled to the controller 170 (FIG. 12) such that the controller 170 may send and/or receive signals to disengage and re-engage the locking member 206. In some embodiments, the locking member 206 may be an electronic latch. In other embodiments, the locking member 206 may be an active lock such as, for example, a key lock, a manual lock, a digital lock, and/or a smart lock. Alternatively, the locking member 206 can be an inertial lock such that the locking member 206 disengages as a result of dynamic forces (e.g., rapid vehicle acceleration and/or deceleration) acting upon the locking member 206.

Figure 9:
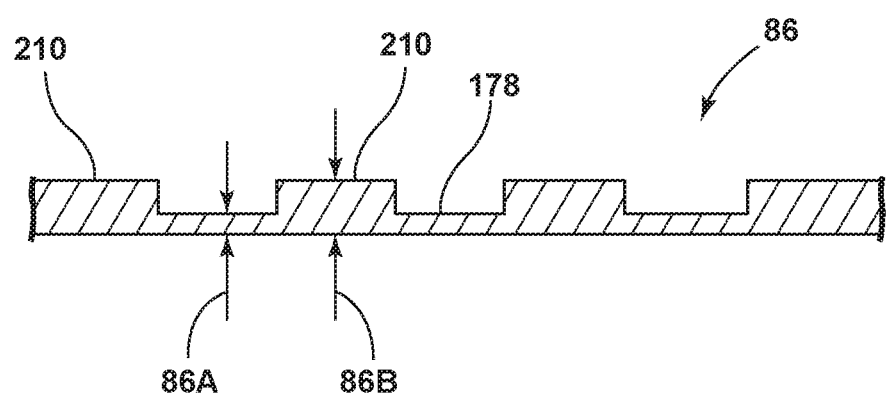
FIG. 9 is a cross-sectional view of a removable floor of the vehicle storage compartment taken at line IX-IX of FIG. 6, illustrating a first thickness and a second thickness, according to some aspects of the present disclosure.

Referring to FIG. 9, the removable floor 86 can include a plurality of raised portions 210 extending from the top surface 178 of the removable floor 86, such that the removable floor 86 has a first thickness 86A and a second thickness 86B. The plurality of raised portions 210 may be configured to assist in collecting moisture and/or liquids and preventing items positioned within the storage compartment 26 from resting in a pool of moisture and/or liquids. In some embodiments, the plurality of raised portions 210 may have substantially linear top surfaces. Alternatively, the plurality of raised portions 210 may be plateaus that extend vertically from the top surface 178 of the removable floor 86 on each side of the plateau with a substantially linear top surface therebetween. In other embodiments, the plurality of raised portions 210 may be, for example, ribs or corrugations that have top surfaces that continually change in height. Alternatively, the removable floor 86 can have a substantially nonlinear top surface 178 that does not define a uniform pattern of raised portions 210. Additionally, first thickness 86A and second thickness 86B of the removable floor 86 can be configured to assist with draining liquids from the storage compartment 26. It may be additionally advantageous to include the plurality of raised portions 210 extending from the removable floor 86 to prevent items within the storage compartment 26 from shifting during vehicle maneuvers.

Figure 10A:
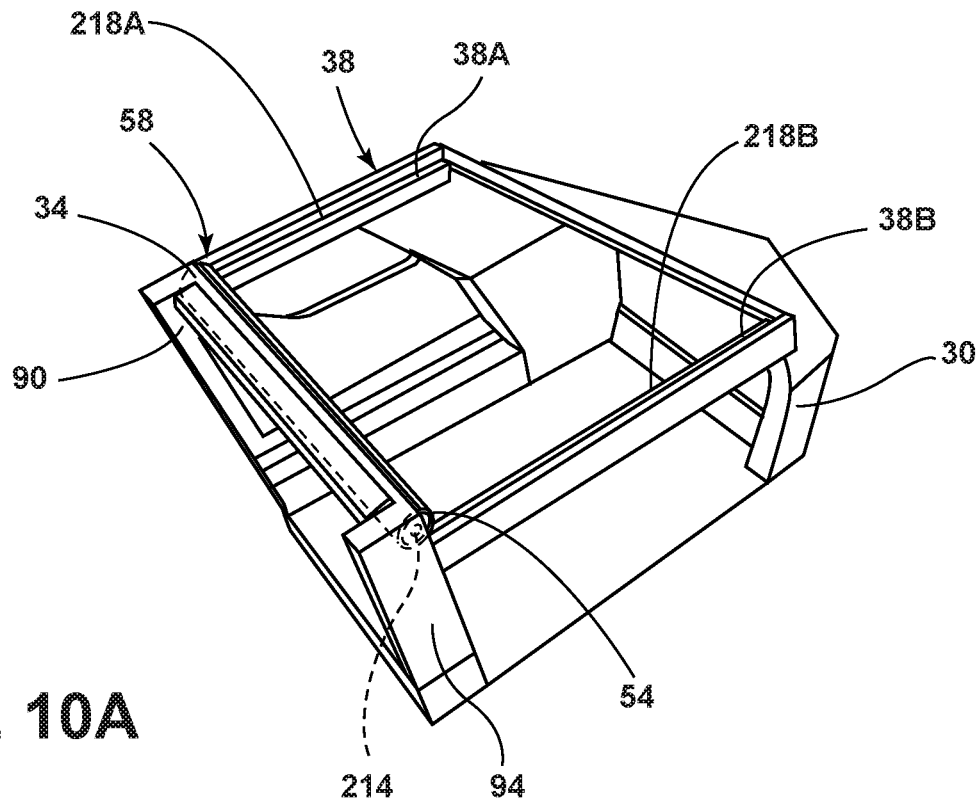
FIG. 10A is a top perspective view of a vehicle storage compartment, illustrating a deployable cover in a stowed position, according to some aspects of the present disclosure.
Figure 10B:
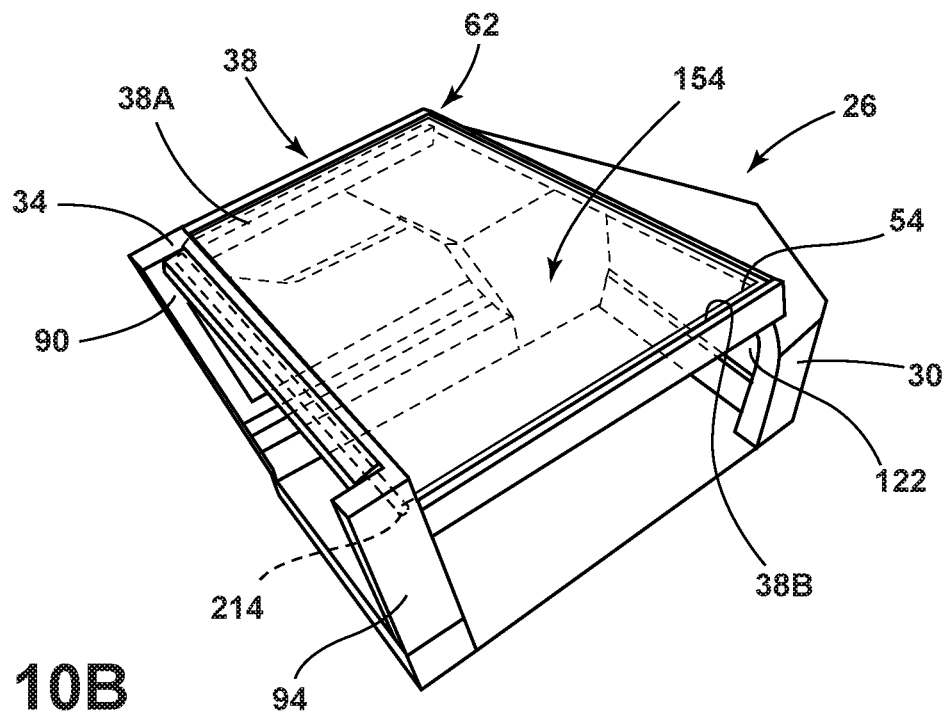
FIG. 10B is a top perspective view of a vehicle storage compartment, illustrating a deployable cover in a deployed position, according to some aspects of the present disclosure.

Referring to FIGS. 10A and 10B, the cover 54 may be coupled to the cross member 34. In various embodiments, the cover 54 may be configured to extend along the first and second tracks 38A, 38B of the track system 38 from the first position 58 to the second position 62. The first position 58 may be a stowed position where the cover 54 is flexible and configured to be coiled about a center support structure 214. In various embodiments, the center support structure 214 may be rotatably coupled to the first and second vertical members 90, 94 of the frame 30. The first and second tracks 38A, 38B may be coupled to interior surfaces 218A, 218B of the first and second sides 30A, 30B of the frame 30, respectively. In some embodiments, the first and second tracks 38A, 38B may extend at least a portion of a length of the frame 30. Alternatively, the first and second tracks 38A, 38B may extend the entire length of the frame 30, such that the cover 54 may extend along the track system 38 from a position proximate the cross member 34 to a position proximate the first wall 122. The track system 38 may be, for example, guide rails and/or elongated indentations within the frame 30.

Referring to FIG. 10B, the second position 62 of the cover 54 may be a deployed position. The cover 54 may extend along the first and second tracks 38A, 38B such that when the cover 54 is in the deployed position the cover 54 is positioned over the interior 154 of the storage compartment 26. It may be advantageous to include the cover 54 in the deployed position to assist in vertically retaining items that may be positioned within the storage compartment 26. Alternatively, the cover 54 may not deploy when objects with a height greater than a height of the storage compartment 26 are positioned within the storage compartment 26. The frame 30 may cooperate with the top surface 194 (FIG. 8A) and/or the cross member 34 to retain the large items within the storage compartment 26. The cover 54 may be configured to deploy along the track system 38 to a location where a front portion 54A is positioned proximate the items extending vertically outward from the storage compartment 26. Additionally, the cover 54 may be formed from a material of sufficient rigidity such as, for example, a metallic material such that the cover 54 may partially deploy and can cooperate with the frame 30 to retain the items extending vertically from the storage compartment 26. The cover 54 may be manually returned to the stowed position. Alternatively, the cover 54 may be coupled to a coiling assembly configured to return the cover 54 to the stowed position. The coiling assembly may be operably coupled to the controller 170 (FIG. 12) such that a signal from the controller 170 can activate or deactivate the assembly and a signal from the coil assembly can indicate the cover 54 is fully deployed, fully returned to the stowed position, and/or in an intermediate position therebetween.

Figure 11A:
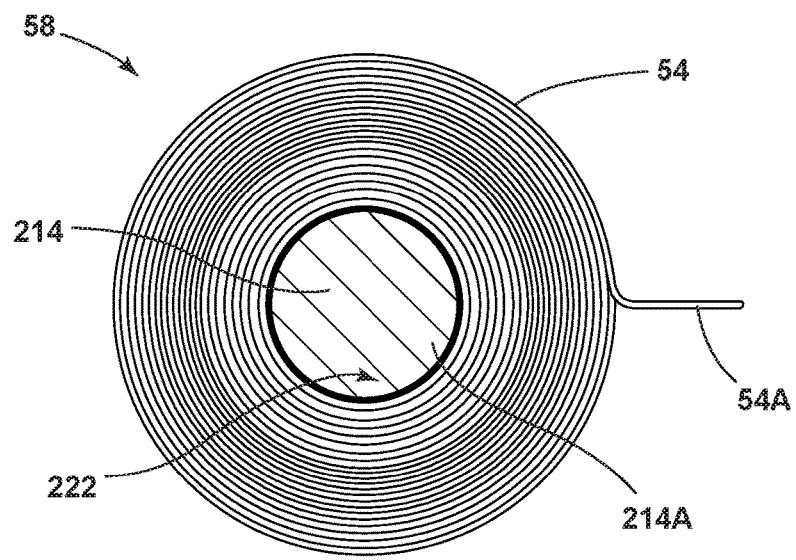
FIG. 11A is a side view of the cover in the stowed position, according to some aspects of the present disclosure.
Figure 11B:
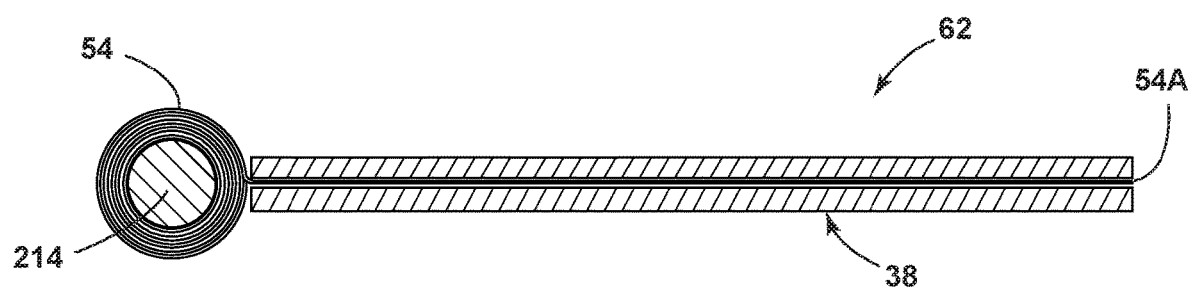
FIG. 11B is a side view of the cover in the deployed position, according to some aspects of the present disclosure.

Referring now to FIGS. 11A and 11B, the first position 58 of the cover 54 may be a stowed position. The front portion 54A of the cover 54 may be positioned within the track system 38 (FIG. 11B) when the cover 54 is in the stowed position to assist the cover 54 is deploying along the track system 38. In various embodiments, the cover 54 may be flexible such that the cover 54 may be coiled around the center support structure 214 in the stowed position. The cover 54 may be made of, for example, vinyl, fabrics, woven textiles, fish netting, cargo netting, and/or thin metallic materials. Alternatively, the cover 54 can be formed from a plurality of substantially rigid panels connected therebetween and operable between the stowed and deployed positions. The storage compartment 26 can include an inertial latching member coupled to the cover 54 such that the inertial latching member disengages as a result of dynamic forces (e.g., rapid vehicle acceleration and/or deceleration) acting upon the inertial latching member. When in the stowed position, the cover 54 may have a center of gravity 222 that is displaced from a center of the center support structure 214. For example, the center of gravity 222 may be located at a lower portion 214A of the center support structure 214. In various embodiments, a force may act upon the center of gravity 222 resulting in the cover 54 moving from the stowed position along the track system 38 to the deployed position. In some embodiments, the force may be due to a change in acceleration of the vehicle 10 (e.g., rapid deceleration). Alternatively, the force may be due to impact on the vehicle 10. Additionally, the storage compartment 26 may include a spring coupled to the cover 54 such that the cover 54 can be spring-loaded and retracted into the stowed position. Additionally, the force of the spring can be overcome by forces acting on the center of gravity 222 as a result of a change in dynamics of the vehicle 10 (e.g., rapid acceleration and/or deceleration) allowing the cover 54 to extend along the track system 38 to the deployed position. The cover 54 can have a length sufficient to extend to the deployed position along the track system 38. In other embodiments, the cover 54 can have a length greater than and/or less than the length of the track system 38.

Figure 12:
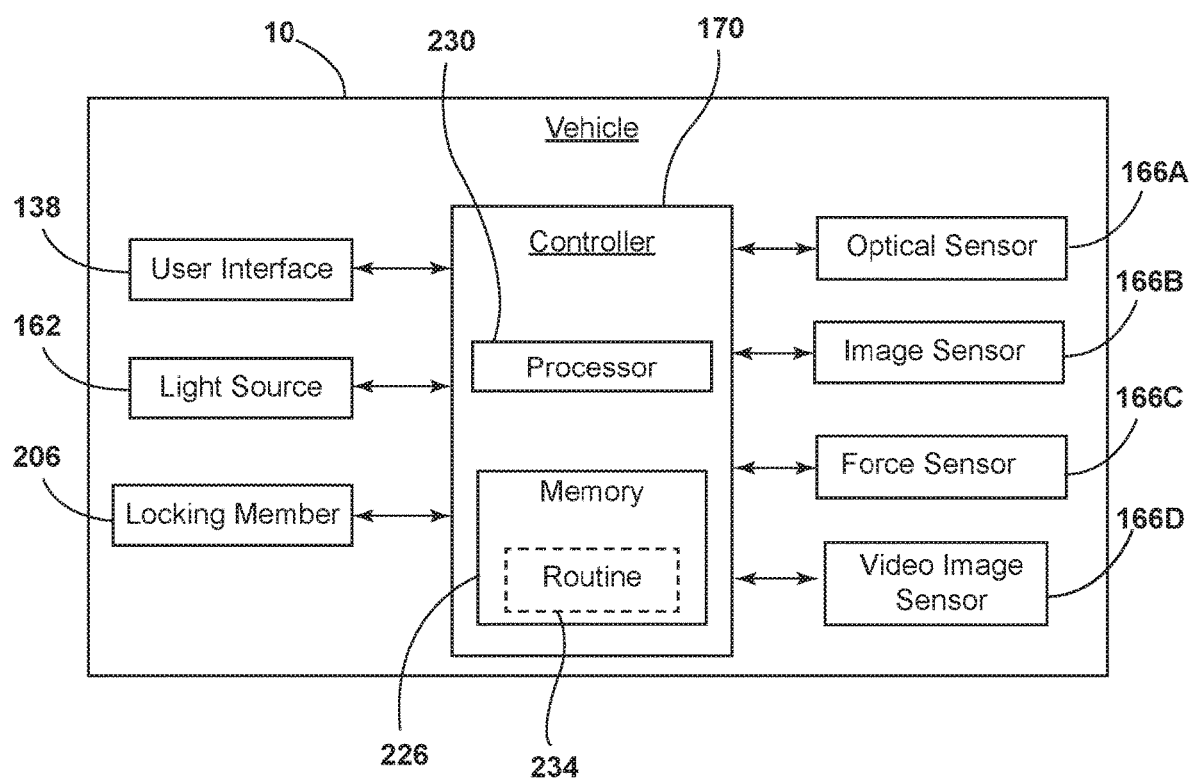
FIG. 12 is a schematic flow diagram of a controller for the vehicle according to some aspects of the present disclosure.

Referring to FIG. 12, the controller 170 may include memory 226 and a processor 230. The memory 226 can contain a routine 234 for operation of the controller 170. The processor 230 is coupled to the memory 226 and is configured to execute the routines 234 contained in the memory 226. In various embodiments, the controller 170 may be configured to send and/or receive signals from the optical sensor 166A, the infrared sensor 166B, the force sensor 166C, and/or the video image sensor 166D. In some embodiments, the controller 170 may be configured to send and/or receive signals to the light source 162. In some embodiments, the controller 170 may be configured to send and/or receive signals from the locking member 206. In other embodiments, the controller 170 may be configured to communicate with vehicle components such as, for example, the user interface 138 and/or the light source 162 to convey to an occupant of the vehicle 10 that items have been left in the storage compartment 26. Additionally, the controller 170 may send and/or receive signals from the locking member 206 to disengage and/or reengage the locking member 206.

Use of the present disclosure may have a variety of advantages. In a first example, the storage compartment 26 can provide additional storage space while providing a substantially linear floor. In conventional vehicle storage compartments, storage compartments are positioned under the seats where there is an uneven floor, which makes storing items more difficult. Use of the present disclosure can provide an easier location to store items such as, for example, luggage and other personal items by having the substantially flat removable floor 86. In a second example, the storage compartment 26 having the cross member 34 can assist in retaining luggage and other items positioned within the storage compartment 26. In conventional storage locations within an interior of the vehicle 10, items are often unsecured such that the items may move or become a projectile during vehicle maneuvers. Use of the present disclosure provides the cross member 34 to assist in retaining the items within the storage compartment 26 during such vehicle maneuvers. In a third example, the cover 54 and/or rotatable member 42 can prevent items positioned within the storage compartment 26 from shifting out the of top or a side of storage compartment 26. Conventional storage compartments often have manually operated doors and/or covers. Use of the present disclose may retain items positioned within the interior 154 of the storage compartment 26 during vehicle maneuvers.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is to be understood that variations and modifications can be made on the aforementioned structure without departing from the concepts of the present disclosure, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A vehicle, comprising:
   a floor;
   a base configured to engage with the floor;
   a frame coupled to the base, wherein the frame includes a first side and a second side, wherein each of the first side and the second side includes a front vertical member and a rear vertical member coupled via a horizontal member;
   a cross member coupled to the horizontal members of the first and second sides of the frame; and
   a rotatable member coupled to the cross member and operable between a closed position and an opened position.

2. The vehicle of claim 1, wherein the cross member is coupled to a vehicle-rearward portion of the frame.

3. The vehicle of claim 1, further comprising:
   a locking member coupled to the rotatable member and operable between an engaged position and a disengaged position.

4. The vehicle of claim 1, wherein the rotatable member includes a substantially transparent portion.

5. The vehicle of claim 1, wherein the rotatable member and the base cooperate to define an aperture accessible to a user in a vehicle-rearward location.

6. The vehicle of claim 1, further comprising:
   a light source coupled to the frame.

7. The vehicle of claim 1, further comprising:
   a removable floor positioned on the base and having a plurality of raised portions, such that the removable floor comprises a first thickness and a second thickness.

8. The vehicle of claim 1, wherein each of the first side and the second side of the frame defines an aperture for accessing a space over the base.

9. The vehicle of claim 1, further comprising:
   a wall coupled to a vehicle-forward edge portion of the base and extending between the first side and the second side of the frame.

10. The vehicle of claim 9, further comprising:
    a top surface coupled to the wall and extending toward the rotatable member.

11. The vehicle of claim 1, wherein the rotatable member has an upper arcuate portion.

* * * * *